(12) United States Patent
Cai

(10) Patent No.: US 12,506,555 B2
(45) Date of Patent: Dec. 23, 2025

(54) MONITOR WINDOW IN ASE INJECTION SEED

(71) Applicant: II-VI Delaware, Inc., Wilmington, DE (US)

(72) Inventor: Shaohua Cai, Shanghai (CN)

(73) Assignee: II-VI DELAWARE, INC., Wilmington, DE (US)

( * ) Notice: Subject to any disclaimer, the term of this patent is extended or adjusted under 35 U.S.C. 154(b) by 270 days.

(21) Appl. No.: 18/177,544

(22) Filed: Mar. 2, 2023

(65) Prior Publication Data

US 2024/0137142 A1 Apr. 25, 2024
US 2024/0235714 A9 Jul. 11, 2024

(30) Foreign Application Priority Data

Oct. 25, 2022 (CN) .......................... 202211308786.4

(51) Int. Cl.
*H04J 14/02* (2006.01)
*H04B 10/25* (2013.01)
*H04B 10/294* (2013.01)

(52) U.S. Cl.
CPC .......... *H04J 14/0201* (2013.01); *H04B 10/25* (2013.01); *H04B 10/294* (2013.01)

(58) Field of Classification Search
CPC .............................. H04B 10/25; H04B 10/294
USPC ............................................................ 398/83
See application file for complete search history.

(56) References Cited

U.S. PATENT DOCUMENTS

| | | | |
|---|---|---|---|
| 8,971,705 B2 * | 3/2015 | Boertjes ............ | H04J 14/02212 398/38 |
| 9,628,174 B2 | 4/2017 | Cahill et al. | |
| 9,768,902 B2 * | 9/2017 | Al Sayeed .......... | H04J 14/0201 |
| 10,833,791 B1 * | 11/2020 | Al Sayeed .......... | H04J 14/0206 |
| 11,139,633 B2 * | 10/2021 | Pei ...................... | H04B 10/0731 |
| 11,990,933 B2 * | 5/2024 | Al Sayeed ............. | H04B 10/03 |
| 12,126,375 B2 * | 10/2024 | Piciaccia ............ | H04B 10/0795 |
| 2018/0269964 A1 * | 9/2018 | Mertz ................ | G02B 6/02061 |

(Continued)

FOREIGN PATENT DOCUMENTS

EP 1128579 A9 * 7/2002 ....... H04B 10/07955

OTHER PUBLICATIONS

Elson et al; High spectral density transmission emulation using amplified spontaneous emission noise; Jan. 2016; Optics letters; pp. 1-4. (Year: 2016).*

*Primary Examiner* — Amritbir K Sandhu
(74) *Attorney, Agent, or Firm* — Blank Rome LLP

(57) ABSTRACT

A reconfigurable optical add/drop multiplexer using a wavelength selective switch (WSS) component to multiplex wavelength channels into a wavelength division multiplexed (WDM) signal. When a given channel is dropped, an amplified spontaneous emission (ASE) injection signal is multiplexed as a ghost channel into the WDM signal. The ASE injection channel can mitigate polarization hole burning and can provide a fuller power spectrum density. However, the ASE injection channel also defines a monitoring window. As an optical channel monitor (OCM) monitors the WDM signal, the OCM can detect, within the monitoring window, any underlying characteristic of the given wavelength channel. In this instance in response to the detected characteristic, the WSS component switches from multiplexing the ghost channel into the WDM signal to multiplexing the given wavelength channel into the WDM signal.

25 Claims, 5 Drawing Sheets

(56) References Cited

U.S. PATENT DOCUMENTS

| | | | |
|---|---|---|---|
| 2022/0131605 A1* | 4/2022 | Edirisinghe | H04J 14/0289 |
| 2022/0385390 A1* | 12/2022 | Ainaka | H04J 14/021 |
| 2023/0412267 A1* | 12/2023 | Piciaccia | H04J 14/02216 |
| 2023/0413367 A1* | 12/2023 | Huang | H04L 5/0023 |

* cited by examiner

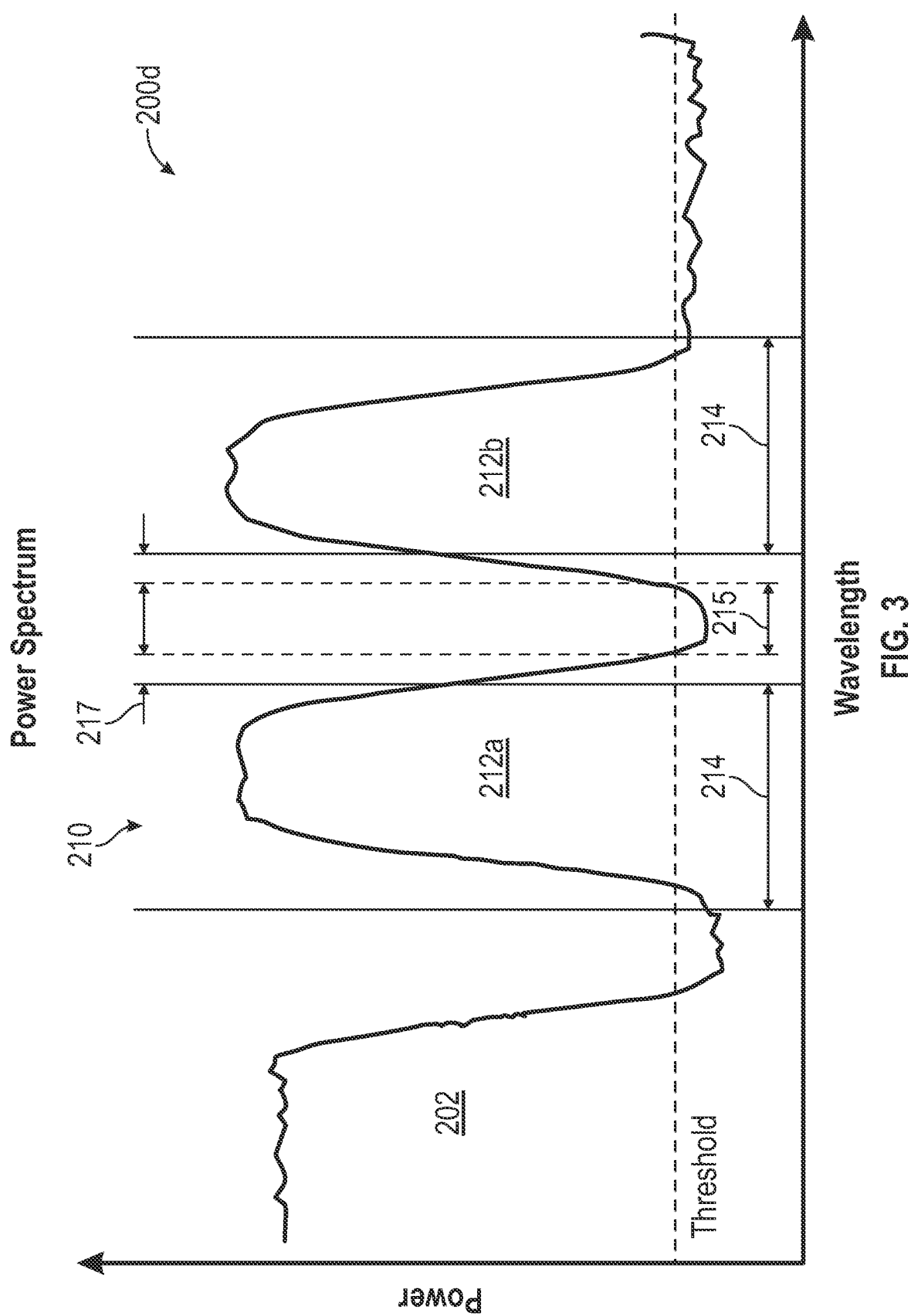

MONITOR WINDOW IN ASE INJECTION SEED

CROSS-REFERENCE TO RELATED APPLICATIONS

The present application claims priority to Chinese Patent Application No. 202211308786.4 filed Oct. 25, 2022. The aforementioned application is hereby incorporated by reference in its entirety.

BACKGROUND OF THE DISCLOSURE

An optical network system performs optical communications using various nodes interconnected by links of optical fibers in a mesh or other topology. The nodes include optical interfaces for communicating information using optical signals between the nodes on the optical fiber links. The optical interfaces of the nodes can include reconfigurable optical add/drop multiplexers (ROADM) having amplifiers, wavelength selective switch (WSS) components, optical channel monitors (OCMs), and other network components. The nodes can also include electrical interfaces at locations in the network to communicate electrical signals with host components.

The optical signals that communicate information between nodes in the network system have multiple channels defined at carrier wavelengths. The number of channels and wavelengths used in the system depends on the particular implementation. Some network systems can dynamically allocate incoming signals to various wavelength channels as needed so that none, some, or all channels are in use at a given time.

Communicating information with the multiple channels over an optical fiber link can use multi-wavelength transmission techniques, such as wavelength division multiplexing (WDM). One transmission technique uses dense wavelength division multiplexing (DWDM), which involves the multiplexing of a denser number of wavelengths onto an optical fiber link. The multi-wavelength transmission technique increases the aggregate bandwidth per optical fiber in the network so the optical networks can transmit greater amounts of information.

The ROADM nodes enable traffic in the WDM system to be remotely switched at the wavelength layer using the WSS components. Commands to the hardware of the ROADM nodes can configure what wavelengths (i.e., colors) are added or dropped at any location in the network, allowing the network to be readily modified as network requirements change. Wavelengths used for communicating information in the optical signals (e.g., working channels) can be added, while other channels can be dropped as unfilled channels.

In some optical networks, amplified spontaneous emission (ASE) provides noise that is used to fill the unfilled channels in the optical signals. In this noise-loading technique, for example, a channel not used for carrying information is replaced by noise, such as generated by an Amplified Spontaneous Emission (ASE) source. When the channel is noise loaded, the ASE noise provides "full power" to the entire spectrum of the optical signal, which has a number of benefits in the system.

In a typical network system, an existing channel power monitor can monitor the output power of an optical signal in a given channel. However, when the given channel is noise loaded, an additional channel power monitor would be needed to monitor any input of a signal source for this channel. As expected, this solution would require additional components to be used in the nodes of the optical network, which would be undesirable and duplicative. What is needed is a way to monitor a given channel when this channel is noise loaded.

The subject matter of the present disclosure is directed to overcoming, or at least reducing the effects of, one or more of the problems set forth above.

SUMMARY OF THE DISCLOSURE

As disclosed herein, an optical network device comprises a wavelength selective switch (WSS) component, an amplified spontaneous emission (ASE) source, and an optical channel monitor (OCM). The WSS component is configured to multiplex wavelength channels from optical signals into a wavelength division multiplexed (WDM) signal. The ASE source is in communication with the WSS component and is configured to generate an ASE signal for multiplexing into the WDM signal. The OCM is in communication with the WSS component and is configured to monitor the WDM signal.

The WSS component, in response to a given one of the wavelength channels being dropped, is configured to multiplex an ASE injection channel from the ASE signal into the WDM signal for the given wavelength channel. The ASE injection channel defining a monitoring window. The OCM is configured to detect, within the monitoring window of the ASE injection channel, a characteristic of the optical signal for the given wavelength channel.

A reconfigurable optical add/drop multiplexer (ROADM) is disclosed herein and comprises a WSS, an ASE source, and an OCM. The WSS component is configured to multiplex wavelength channels from optical signals into a wavelength division multiplexed (WDM) signal. The ASE source is in communication with the WSS component and is configured to generate an ASE signal for multiplexing into the WDM signal. The OCM is configured to monitor the WDM signal.

The WSS component, in response to a given one of the wavelength channels being dropped, is configured to multiplex a ghost channel from the ASE signal into the WDM signal. The ghost channel defines a monitoring window. The optical channel monitor is configured to detect, within the monitoring window, a characteristic of the optical signal for the given wavelength channel. The WSS component is configured, in response to the detected characteristic, to switch from multiplexing the ghost channel into the WDM signal to multiplexing the given wavelength channel into the WDM signal.

A method disclosed herein comprises: multiplexing, with wavelength selective switching, optical signals into wavelength channels of a wavelength division multiplexed (WDM) signal; generating an amplified spontaneous emission (ASE) signal and multiplexing a ghost channel from the ASE signal into the WDM signal with the wavelength selective switching in response to a given one of the wavelength channels being dropped, the ghost channel defining a monitoring window; optical channel monitoring the WDM signal; and detecting, within the monitoring window in the optical channel monitoring, a characteristic of the optical signal for the given wavelength channel.

The foregoing summary is not intended to summarize each potential embodiment or every aspect of the present disclosure.

BRIEF DESCRIPTION OF THE DRAWINGS

FIG. 3 illustrates a monitor window for amplified spontaneous emission injection according to the present disclosure.

DETAILED DESCRIPTION OF THE DISCLOSURE

Figure 1:
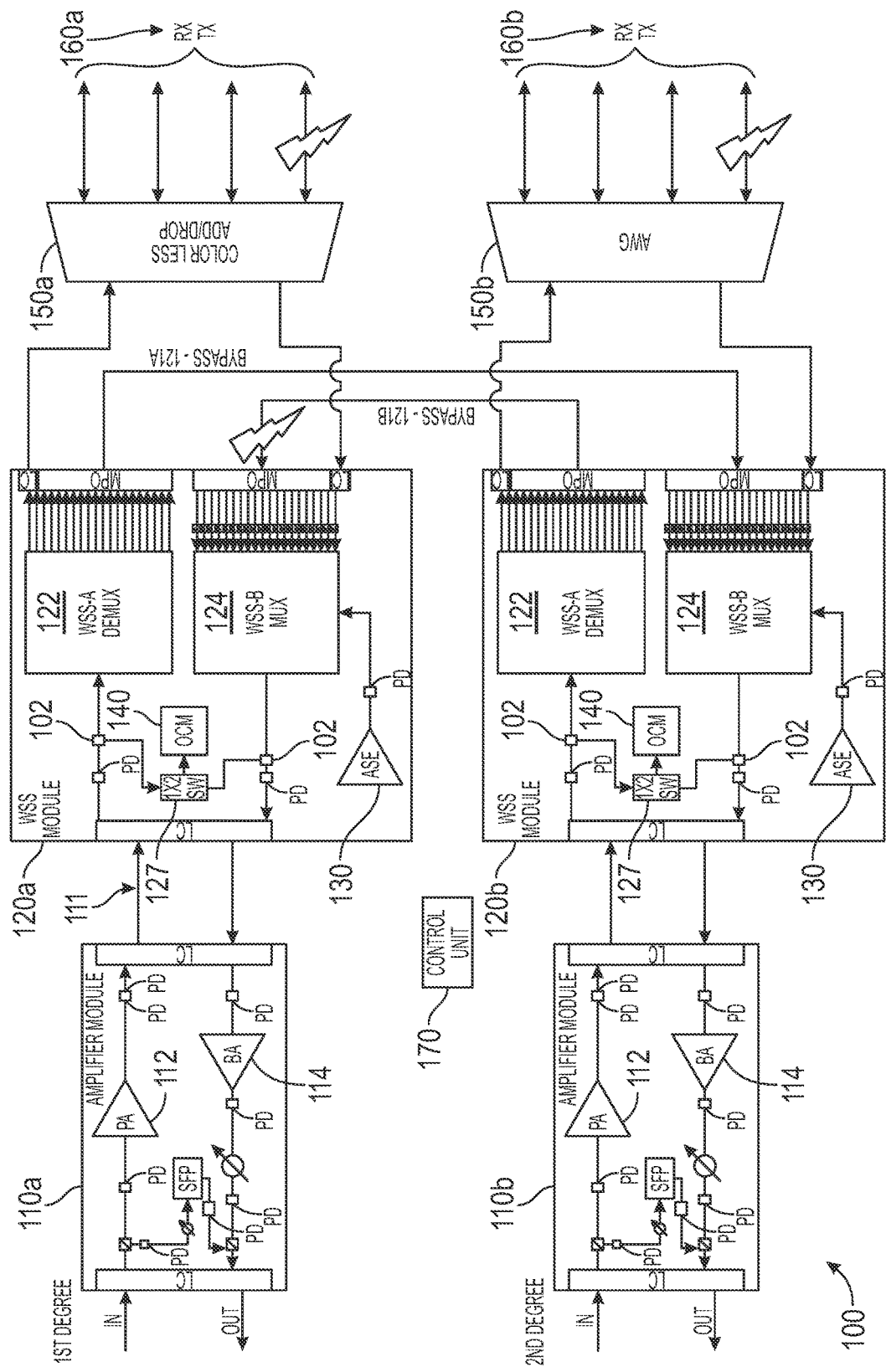
FIG. 1 illustrates a node of an optical network system according to the present disclosure.

FIG. 1 illustrates a node 100 of an optical network system according to the present disclosure. For a given network topology, the node 100 has an associated number of "degrees" with each degree designated for a network link to the node 100. The node 100 can have any number of degrees depending on the implementation. A network interface for the node 100 shown here has two degrees (first degree and second degree). Each degree of the two-dimensional node 100 has a wavelength selective switch (WSS)-based reconfigurable optical add-drop multiplexer (ROADM) and other modules. The ROADM can be used to remotely and dynamically switch traffic in a WDM system at the wavelength layer. Individual wavelengths carrying data channels can be added and dropped without the need to convert the signals on all of the WDM channels to electronic signals and back again to optical signals.

Optical signals are communicated to and from the node 100 along the optical fibers of the network using an amplifier module 110a-b, which includes a pre-amplifier 112 and a booster amplifier 114. Optical signals of each amplifier module 110a-b communicate with a WSS module 120a-b. Each of the WSS modules 120a-b has two WSS components or units 122, 124 and has an OCM 140. The number of WSS units 122, 124 for an M-dimensional ROADM node is 2M so the example 2-dimensional node 100 shown here has four WSS units 122, 124. Other configurations can be used with more network links.

As shown in the amplifier modules 110a-b, the optical amplifier 112 (pre-amplifier) installed at the receiver end amplifies input optical signals that are then communicated to a 1×N WSS unit 122, which performs demultiplexing. The pre-amplifier 112 amplifies the optical signals to a required level to ensure that they can be detected by receivers (Rx) of transceivers 160a-b.

The optical (booster) amplifier 114 installed in the transmitting end amplifies output optical signals communicated from a 1×N WSS unit 124, which performs multiplexing. The booster amplifier 114 amplifies the optical signals launched into a fiber link to provide low gain and high output power. The optical amplifiers 112, 114 can use a gain medium, such as a fiber amplifier, semiconductor optical amplifier (SOA), Raman amplifier (RA), or the like. In the present example, the optical amplifiers 112, 114 include erbium-doped fiber amplifiers (EDFA), but any other suitable amplifier may be used. Features of a DCM (Dispersion Compensation Module) can be added to ensure transmission quality.

As noted above, each WSS module 120a-b has two WSS units 122, 124 and has an optical channel monitor (OCM) 140. Each WSS module 120a-b also has an amplified spontaneous emission (ASE) source 130. The OCM 140 may be any component or set of components operable to provide information on the optical power of the individual optical channels that make up the multiplexed wavelengths of the optical signals. A 1×2 switch 127 can direct optical signals to the OCM 140 to perform optical channel monitoring of incoming and outgoing optical signals. As noted above, one WSS unit 122 is a multiplexer, and the other WSS unit 124 is a demultiplexer. Bypass signals 121a-b are routed between the WSS modules 120a-b. As shown, various photodetectors and optical couplings are provided for monitoring the optical signals.

Each WSS module 120a-b use multiplexers 150a-b, such as a colorless add/drop multiplexer 150a and an arrayed waveguide grating (AWG) 150b, to communicate optical signals with a user network interface. As shown here, the user network interface has transmitters (Tx) and receivers (Rx), which can be provided by transceivers 160a-b connected to host equipment (not shown) at a network location. The transmitters (Tx) and receivers (Rx) connect with electrical connections to the host equipment. Each transmitter (Tx) has a signal source for providing optical signals, and each receiver (Rx) has a detector for detecting optical signals.

The network system 100 can use dense wavelength division multiplexing (DWDM) to multiplex a dense number of optical channels at carrier wavelengths onto the optical fiber links. Optical signals incoming to one degree of the node 100 can be added, dropped, and/or amplified before exiting the other degree of the node 100.

At any time during operation, for example, the optical strength of the multiplexed wavelengths of the optical signals can reach a certain point, and the optical amplifier 112, 114 may reach a maximum of its linear response. At this point, the amplifier 112, 114 operating on optical signals beyond this maximum becomes saturated and may behave in a non-linear fashion. For example, when amplifying a saturating signal, the optical amplifiers 112, 114 may experience polarization hole burning (PHB), which can reduce signal quality. To mitigate the effects of PHB, amplified spontaneous emission (ASE) injection can be made in the WSS module 120a-b to generate one or more ASE injection channels (i.e., ghost channels), which include ASE noise.

At any time during operation, for example, any of the various optical channels may be dropped. To mitigate the effects of PHB and to stabilize the operation of the node, amplified spontaneous emission (ASE) injection can be made in the WSS module 120a-b to generate one or more ASE injection channels (i.e., ghost channels) to replace one or more of the dropped channels.

As shown, both of the WSS modules 120a-b are configured to generate ASE injection channel(s). In each module 120a-b, for instance, an ASE injection source 130 connects to the multiplexing WSS unit 124 to produce ASE injection channels that can reduce the deleterious effects of PHB and can replace dropped channels. The WSS unit 124 adds a ghost channel (i.e., ASE injection channel) by routing the ASE injection signal from the ASE injection source 130 to a port for a working channel that is dropped or missing its underlying optical signal. As discussed herein, the ASE injection channel (i.e., ghost channel) is the propagation of optical energy lacking any signal information. By contrast, a traffic channel or a working channel within the multichannel optical signal carries information along its carrier wavelength at a given moment. The ASE injection channel may be treated like other optical channels for the purposes of amplification and/or propagation, but the ASE injection channel does not carry information. Instead, the ASE injection channel is amplified to have an optical strength at or near the optical strength of the optical channel used to conduct traffic.

As noted, one or more optical channels in the optical signals may be dropped, not used, missing, or otherwise unfilled at some point during operation. In this instance, the power spectrum density (PSD) of DWDM lines 111 will change after the optical amplifier modules 110*a-b*. This will cause the control of the optical power for the node to change. In this situation, the ASE source 130 injects an ASE injection signal or channel, which is added as a ghost channel in place of the dropped channel, to keep the PSD at the same level as before. The ASE source 130 is used to emulate the dropped channel, and the spectral shape and the central frequency of the dropped channel can be dynamically adjusted by the WSS unit 124.

In the meantime, the node 100 continues to monitor the status of the optical power for the dropped channel using the OCM 140. As explained below, the ASE injection channel from the WSS unit 124 includes a monitoring window. In other words, the ASE injection channel includes two subchannels separated by a monitoring window. The WSS unit 124 routes any underlying optical signal for the dropped channel in the interval of that monitoring window to the same port for the ASE injection channel. If optical power from the underlying optical signal associated with the dropped channel is added, returned, restored, recovered, or the like, the OCM 140 detects the optical power from the added optical signal in the monitoring window, and the WSS unit 124 switches from the ASE source 130 back to the underlying optical signal at the multiplexing WSS unit 124 for the optical channel in question. In general, the optical signal at the multiplexing WSS unit 124 can be from bypass signals 121*a-b* or the multiplexer 150*a-b*.

While the subject channel is dropped, the ASE injection channel replaces the dropped channel to produce the full band of the optical signal, while the ASE injection channel also allows the optical power of the underlying optical signal to be monitored and detected. To do this injection while still allowing the input of the signal source for the subject channel to be monitored, a narrow-band ASE injection channel having the monitoring window opened in the spectrum of the dropped channel is injected from the ASE source 130 for the dropped channel. The narrow-band ASE injection channel will produce a high power spectrum density, but the window in the ASE injection channel will allow for detection and monitoring of the optical power of the underlying optical signal. In this way, the OCM 140 can monitor a characteristic (e.g., the power) of the ASE injection channel while also monitoring for a characteristic (e.g., the power) of an underlying optical signal added back to the dropped channel at the same time.

To illustrate how a narrow-band ASE injection channel replaces a dropped channel and how the optical signal added back to the dropped channel can be detected in a monitoring window of the narrow-band ASE injection channel, the discussion turns to examples of FIGS. 2A-2E.

Figure 2A:
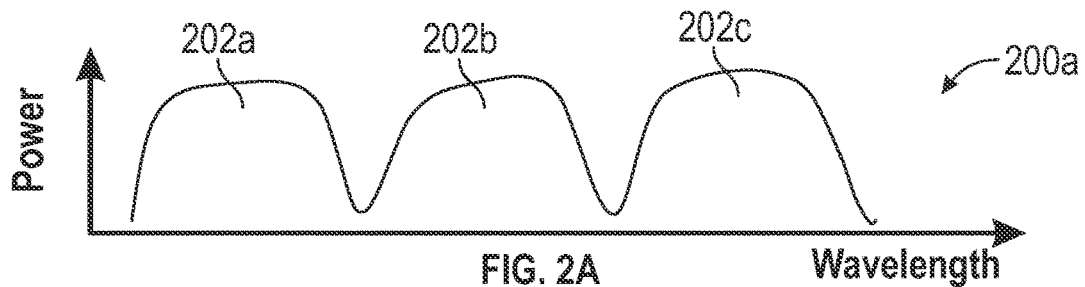
FIG. 2A illustrates the power spectrum of working channels of an optical signal according to the present disclosure.

First, FIG. 2A shows an example of a normal power spectrum 200*a* having multiple optical channels 202*a-c*. A number of neighboring optical channels 202*a-c* are shown that make up the multiplexed wavelengths in an optical signal for the network communications. In this example, the power for three optical channels 202*a-c* at separate channel wavelengths is shown, and each of the neighboring channels 202 is shown as making up the optical signal. Surrounding channels 202*a-c* such as shown here may mitigate the effects of PHB for any given channel. In most cases, however, the network system does not operate at full capacity, and only a certain percentage of communication channels carry information as traffic channels at any given time. At times then, a particular traffic channel 202*a-c* carrying information may be isolated from other neighboring optical channels that carry information. Thus, a given traffic channel 202*a-c* may be adjacent to one or more neighboring channels that are unfilled or doped. In this situation, the detrimental effects of PHB may be more pronounced.

Figure 2B:
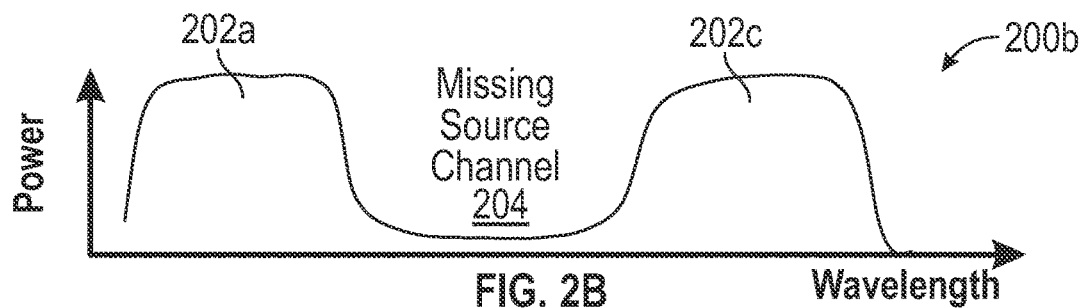
FIG. 2B illustrates the power spectrum of the optical signal with one of the working channels dropped.

In FIG. 2B, one of the optical channels 204 is shown dropped or missing from the power spectrum 200*b* for whatever reason. For example, the given optical channel 204 may not be used to carry information at a given time so that it is unfilled or dropped. The dropped channel 204 may simply not be used in the optical signal at the time or may not have been initially set up for the network system so it can be added later.

Figure 2C:
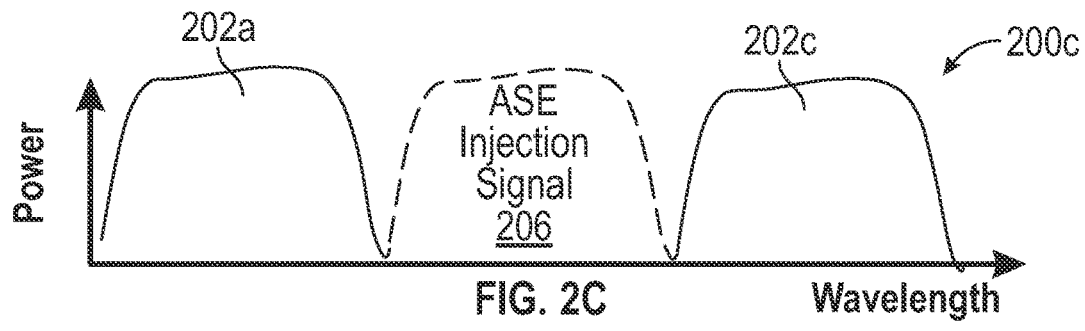
FIG. 2C illustrates the power spectrum of the optical signal with an amplified spontaneous emission injection signal applied according to the prior art.

In a typical solution for ASE injection as shown in FIG. 2C, an ASE injection signal or channel 206 is added to replace the dropped channel. Accordingly, the spectrum of that dropped channel 206 is replaced by an ASE injection channel to keep the total power constant for the power spectrum 200*c*. The network system can thereby have stable, predictable performance across the system, regardless of the channel count. Eventually, an ASE injection channel at that dropped spectrum can be replaced by the optical signal for the optical channel when used to carry information.

Figure 2D:
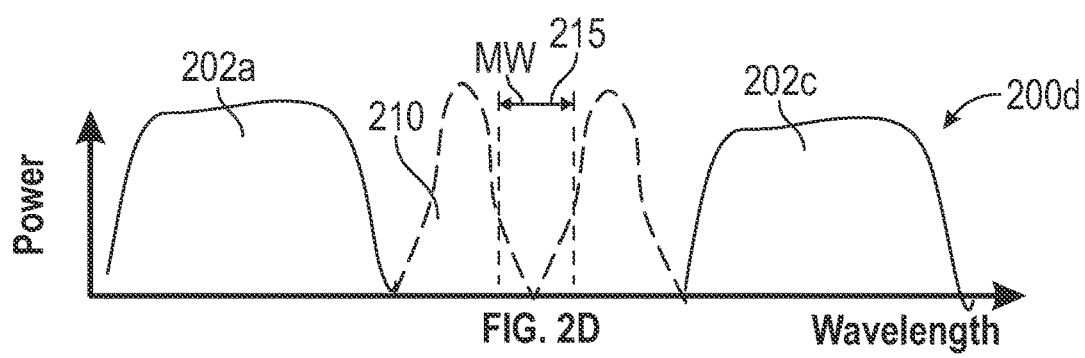
FIG. 2D illustrates the power spectrum of the optical signal with amplified spontaneous emission injection applied according to the present disclosure.

In contrast to the ASE injection channel 206 of FIG. 2C, the ASE injection of the present disclosure as shown in FIG. 2D uses an ASE injection channel 210 having a monitoring window (MW) 215. This ASE injection channel 210 is added to replace the dropped channel as before but allows for additional monitoring of the underlying optical signal in the monitoring window 215.

Figure 2E:
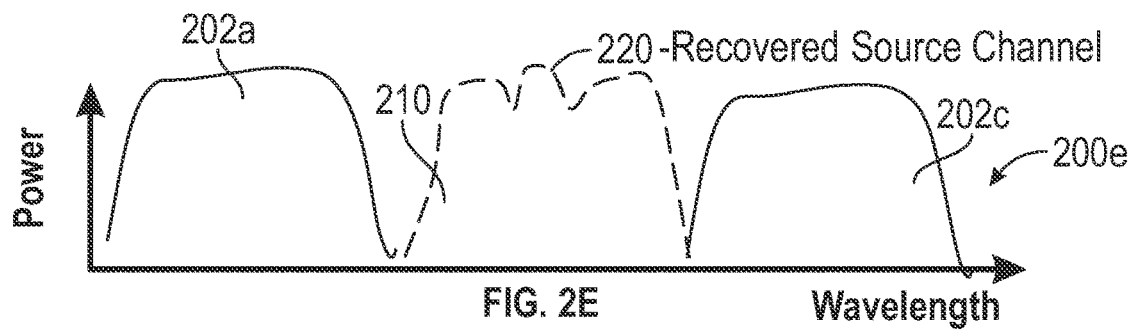
FIG. 2E illustrates the power spectrum of the optical signal with a recovered source channel in the monitoring window of the amplified spontaneous emission injection of the present disclosure.

As long as the underlying optical signal for the spectrum at this dropped channel remains missing, the node (100) can benefit from a full power spectrum density provided by the peaks of the ASE injection channel 210. Yet, at the same time as shown in FIGS. 2D-2E, the monitoring window 215 (MW) allows monitoring to be performed to detect a characteristic (e.g., restored optical power 220) of the underlying optical signal for the working channel once added or restored back to the optical signal.

As can be seen, the narrow-band ASE injection channel 210 will produce a high power spectrum density at the spectrum of the dropped channel. In conventional systems, ASE injection may cause nonlinear effects for other in-line services. Here, however, the narrow-band ASE injection channel of the present disclosure has a similar PSD as the underlying channel so it is not expected to cause nonlinear effects. Moreover, as the OCM (140) monitors the power of the ASE injection channel 210, the monitoring window 215 (MW) in the narrow-band ASE injection channel 210 allows the OCM (140) to also detect that the power 220 of the restored source channel has been added back to the optical signal. With this detection, the multiplexing WSS unit (124) can switch from using the ASE injection channel 210 back to using the underlying optical signal associated with the restored source channel.

FIG. 3 illustrates a monitoring window 215 for an ASE injection signal or channel 210 according to the present disclosure in more detail. The power spectrum 200d of an optical signal is shown. An optical channel is dropped or missing in a wavelength channel of the spectrum 200d. At the dropped channel, the ASE injection channel 210 is added and includes two ASE subchannel signals 214, which produce peaks in the power spectrum for the dropped channel. These ASE subchannel signals 214 are separated by a signal window 215 and are routed to a port for the wavelength channel during wavelength selective switching.

As shown, the signal window 215 lies in the spectrum between the two ASE subchannel signals 214 falling below a certain power threshold. A guard band 217 is provided on each side of the signal window 215 with an appropriate size for spectral efficiency appropriate to the network system. When the signal source of the dropped channel is added back to the optical signal, the monitoring window 215 provides an interval in the spectrum to simultaneously monitor for the addition of the optical power of the optical signal while the system also benefits from a fuller power spectrum density provided by the peaks of the ASE subchannel signals 214. A portion of the underlying wavelength signal can be routed in the interval of the monitoring window 215 to the port for the wavelength channels during wavelength selective switching. This allows the OCM (140) to detect the underlying channel's output power present in the interval of the monitoring window 215 so a determination can be made that the underlying wavelength channel is added and the ASE injection can be stopped for the channel. In essence, the OCM (140) can monitor three independent subchannels for a dropped channel to determine if the underlying optical signal of the working channel has been added. These three independent subchannels include the ASE subchannel signals 214 and any interval of the underlying working channel's optical signal present in the monitoring window 215.

Having an understanding of the ASE injection of the present disclosure, the discussion turns to additional details of the components of a node.

Figure 4A:
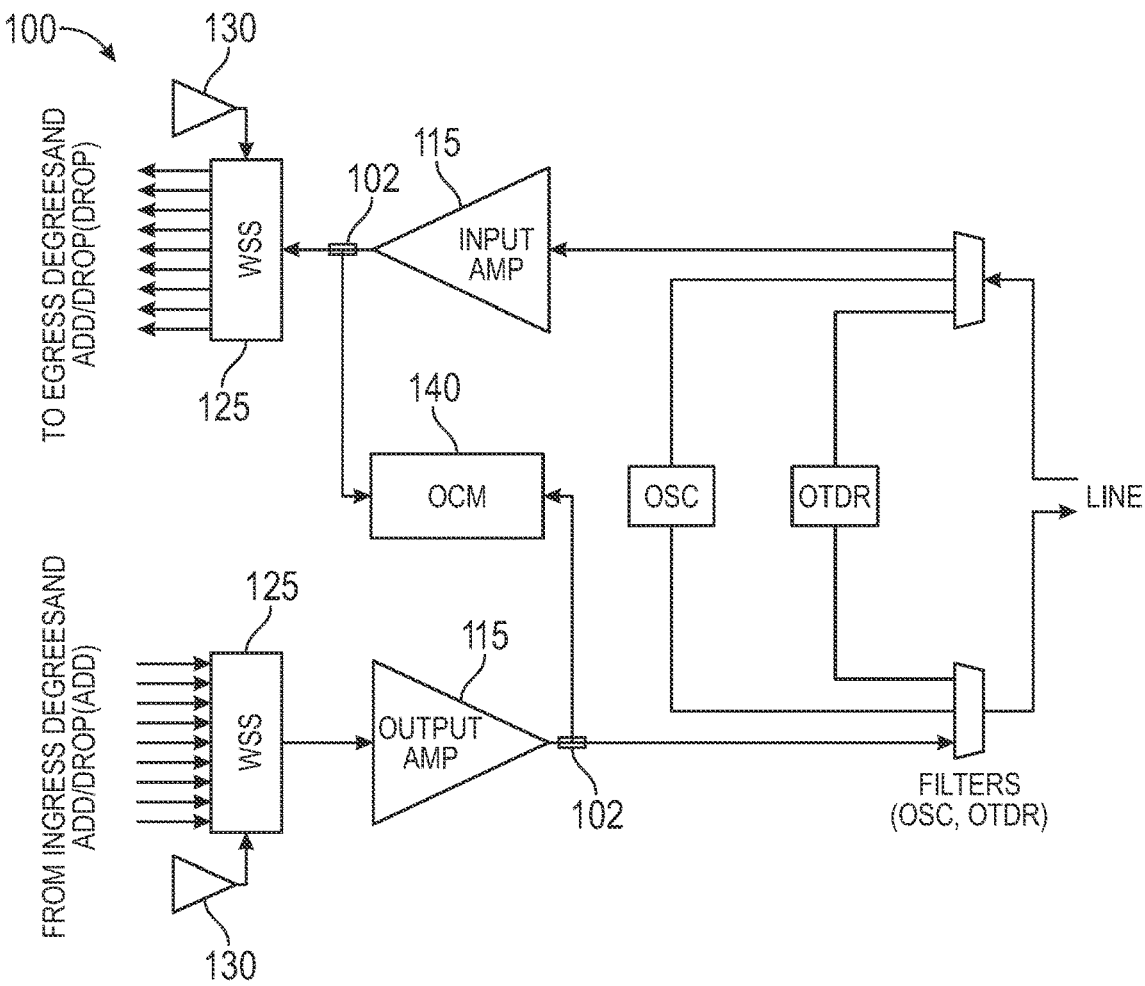
FIG. 4A illustrates an optical diagram for components of a node according to the present disclosure.

FIG. 4A shows an optical diagram for elements of a ROADM-based node 100—only a portion of which is shown—and includes amplifiers 115, WSS components 125, and an OCM 140. As will be appreciated, the amplifier 115, the WSS component 125, the ASE source 130, and the OCM 140 shown here correspond to the elements depicted in the arrangement of FIG. 1. Additional elements can include an Oscillator (OSC) module and an Optical Time Domain Reflectometer (OTDR) module. As noted, the OCM 140 is used to monitor the power level of each wavelength channel. The power information can be used by link control to attenuate each wavelength with the WSS components 125 at ROADM sites, or the power information can be used by dynamic gain equalization (DGE) at inline amplifier (ILA) sites to optimize the power level of each wavelength.

Figure 4B:
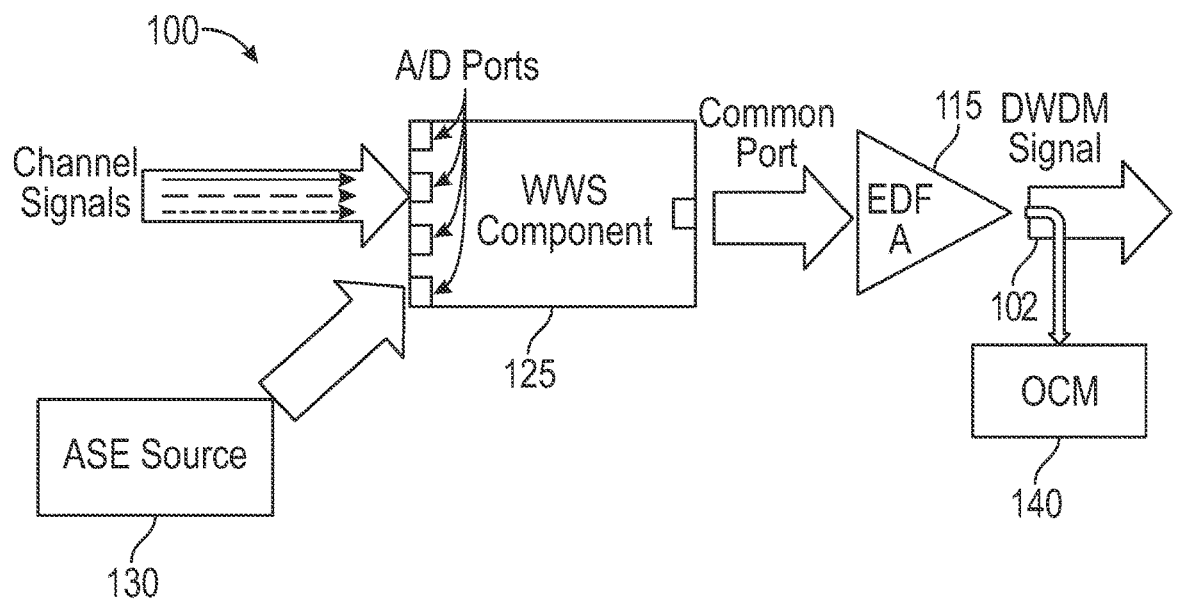
FIG. 4B illustrates an optical diagram for performing amplified spontaneous emission injection according to the present disclosure.

FIG. 4B illustrates an optical diagram for a ROADM-based node 100—only a portion of which is shown—to perform the ASE injection according to the present disclosure. Optical channels are input to add/drop ports of a WSS component 125 of the node 100B. One or more of these optical channels carry traffic for the network and come from any of the various signal sources associated with the node 100 as detailed in FIGS. 1 and 4A.

The WSS component 125 performs the wavelength selective switching to output multiplexed optical channels of an optical signal to a common port. An optical amplifier 115 (e.g., EDFA) amplifies the optical signal to provide the DWDM signal for network communication. At this point, the OCM 140 can monitor the DWDM signal, for example, by using a tap or coupling 102 that directs a portion of the optical signal to the OCM 140. (As will be appreciated, the amplifier 115, the WSS component 125, the ASE source 130, and the OCM 140 shown here correspond to the elements depicted in the arrangement of FIGS. 1 and 4A.)

If an optical channel is dropped, not used, missing, or otherwise "unfilled" in the input optical signal, the power spectrum density (PSD) of the DWDM signal as noted above will change after the optical amplifier 115. This in turn will cause the control of the optical power to change for the node 100. In this situation, the ASE source 130 is used to inject an ASE injection channel of the present disclosure to the WSS component 125, which replaces the dropped channel with the ASE injection channel in the dropped channel that keeps the PSD at the same level as before.

In the meantime, the OCM 140 can continue to monitor the status of the optical power for the underlying optical signal for the dropped channel in the optical signal. If the optical power for the underlying optical signal of the dropped channel is added, returned, restored, recovered, etc., the OCM 140 can detect the optical power within the monitoring window (215) of the ASE injection channel (210). The WSS component 125 is then directed to switch from the ASE source 130 back to the underlying optical signal for the subject optical channel.

To do this and as discussed previously, the narrow-band ASE injection channel (210; FIGS. 2D & 3) is injected into the optical signal to replace the dropped channel. The ASE injection channel (210) has the narrow monitoring window (215) opened in the spectrum for the subject channel. To determine that the underlying optical signal for the subject channel has been added back, the OCM 140 can detect the optical power for a portion (220; FIG. 2D) of the underlying optical signal when added into the narrow window (215) of the ASE injection channel (210). At this point, the WSS component 125 can be directed to switch from the ASE source 130 back to the underlying optical signal for the subject optical channel.

Figure 4C:
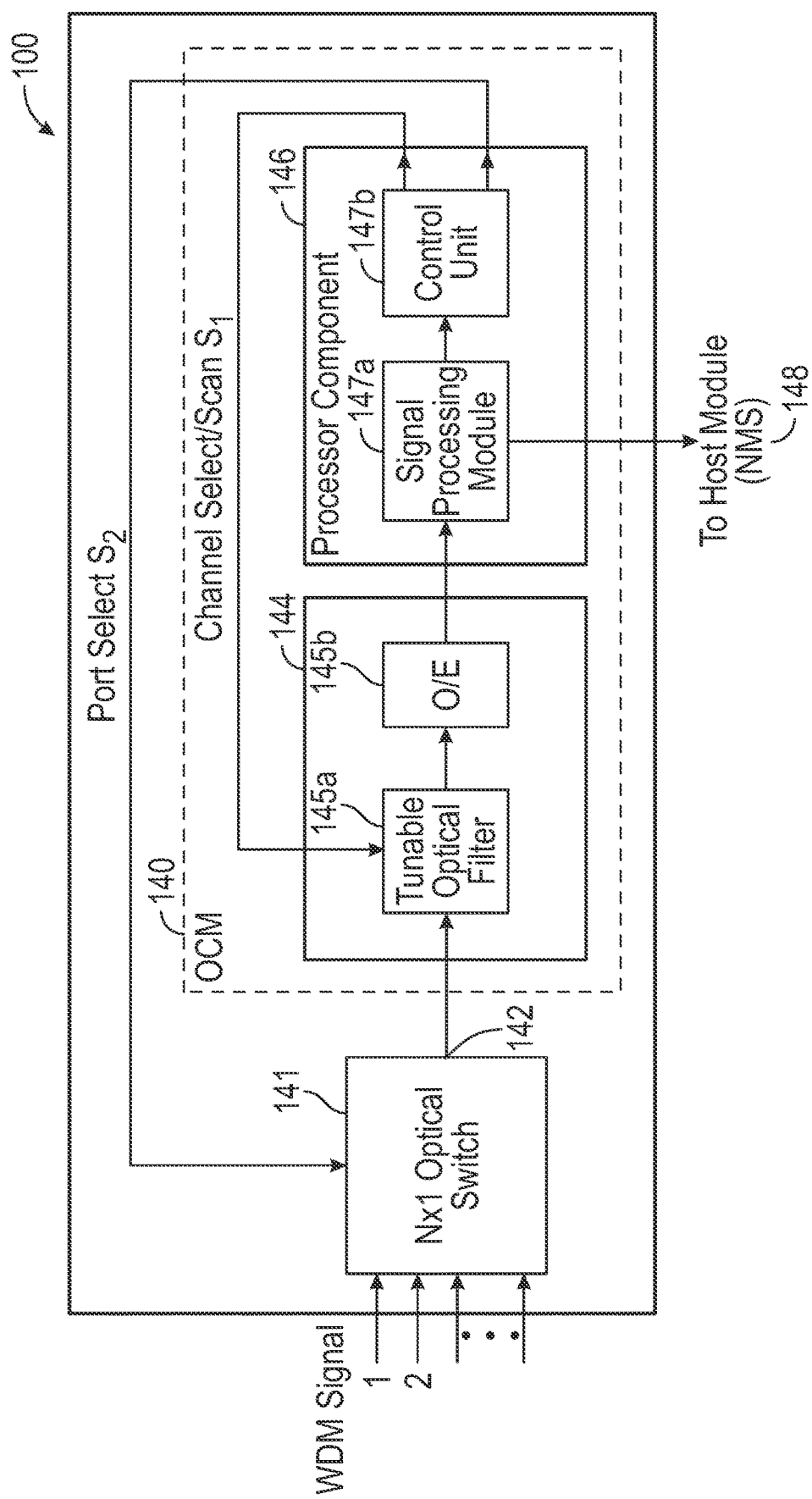
FIG. 4C illustrates a schematic system diagram of an optical channel monitor device for a node of the present disclosure.

FIG. 4C illustrates a ROADM-based node 100—only a portion of which is shown—having a schematic system diagram of an optical channel monitor (OCM) 140. The OCM 140 is configured to receive incoming wavelength division multiplexed optical signals. The WDM signals are coupled to an input or optical switch module 141, which is capable of switching the signals to be passed to scanning and processing circuitry to perform the primary spectral monitoring of the WDM channel spectrum. (This switch module 141 is different from the switch 127 noted in the node 100 of FIG. 1, which can simply be used to switch between incoming and outgoing WDM signals in the WSS modules 120a-b.)

This switch module 141 can perform the same wavelength channel switching as performed by the WSS components (e.g., 124, 125) noted above so the two ASE subchannels along with any underlying optical signal can be routed to an appropriate port. In other words, the switch module 141 includes a wavelength selective switch configured to demultiplex the multiplexing of the WDM signal performed by the WSS component (124, 125). A control unit 147b performs controlling functions of the OCM 140, including controlling the switch 141 to switch between WDM signals and selecting the channel to be scanned and processed.

To perform the monitoring functions of the present disclosure, a detection module 144 receives an incoming optical signal and provides an electrical output signal representative of the optical signal. The incoming optical signal supports the propagation of multiple optical channels, each operating at a different wavelength. A tunable optical filter 145a receives the incoming optical signal and scans across a predetermined wavelength range of interest for the set of channels associated with that signal. A photodetection device 145b, such as a photodiode, detects the optical output signal from the tunable filter 145a and transforms the optical signal into an equivalent electrical representation, such as a raw data spectrum. A signal processing module 147a within a processor component 146 analyzes the raw data spectrum from the electrical signal to ascertain a selected characteristic of the associated optical signal (e.g., power, level, wavelength OSNR, etc. of each separate channel contained within the incoming optical signal). The OCM 140 then provides this information as output information to a host module (148), typically a network management system (NMS), for use in controlling/correcting the characteristics of each individual channel.

The processor component 146 of the OCM 140 also includes a control unit 147b, which controls the port selection of the optical switch module 141 and controls the channel selection of the tunable optical filter 145a. For example, the control unit 147b directs the specific operation of the tunable optical filter 145a to scan through a particular set of wavelength channels contained within the optical signal appearing at the input to filter 145a. As the tunable filter 145a controls the various wavelength components passing through, photodetector 145b then converts the received signal power at each channel into an electronic signal for further analysis within signal processing module 146 (i.e., measurements of center wavelength, signal power, OSNR, etc.). This information may be stored within a database included within processor component 146 (not shown) and/or sent to a host unit 148 (such as a network monitoring system (NMS)) for additional study. Although not shown, the OCM 140 may include a wavelength reference device (not shown) to provide a wavelength reference to re-calibrate operation and account for wavelength drift within the tunable filter 145a.

In monitoring the optical signals, the OCM 140 can determine when any optical power from the underlying optical signal for a dropped channel is present in the monitoring window of the ASE injunction signal. To do this, the tunable filter 145a can select the dropped channel and can scan the wavelength range in the monitoring window of the ASE injection signal. The photodetector 145b can detect any optical power in this monitoring window. If optical power is detected in the monitoring window, the control unit 147b can determine that the previously dropped channel has been added back. At this point, the WSS component (i.e., WSS unit 124 of FIG. 1 or the WSS component 125 of FIG. 2A) can switch from the ASE source (130) back to the underlying optical signal for the subject optical channel. The control unit 147b of the OCM 140 may direct this switching from the ASE source (130) to the underlying optical signal. Alternatively, other control circuitry, such as control circuitry (not shown) of the WSS module 120a-b in FIG. 1 or such as a centralized control unit 170 for the node 100 shown in FIG. 1, may perform this function.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An optical network device, comprising:
a wavelength selective switch (WSS) component configured to multiplex wavelength channels from optical signals into a wavelength division multiplexed (WDM) signal;
an amplified spontaneous emission (ASE) source in communication with the WSS component and being configured to generate an ASE signal for multiplexing into the WDM signal; and
an optical channel monitor in communication with the WSS component and being configured to monitor the WDM signal,
wherein the WSS component, in response to a given one of the wavelength channels being dropped, is configured to multiplex an ASE injection channel from the ASE signal into the WDM signal for the given wavelength channel, the ASE injection channel comprising: a monitoring window and two ASE subchannels for the given wavelength channel, the monitoring window having a spectrum between the ASE subchannels with guard bands between the monitoring window and the two ASE subchannels; and
wherein the optical channel monitor is configured to detect, within the monitoring window of the ASE injection channel, a characteristic of the optical signal for the given wavelength channel.

2. The optical network device of claim 1, comprising an amplifier in communication with the WSS component and being configured to amplify the WDM signal.

3. The optical network device of claim 2, wherein the amplifier comprises a fiber amplifier.

4. The optical network device of claim 1, comprising a coupling being configured to direct the WDM signal to outputs, the optical channel monitor in communication with one of the outputs of the coupling.

5. The optical network device of claim 1, wherein the WSS component is configured to multiplex a portion of the optical signal for the given wavelength channel as a source subchannel into the monitoring window defined in the spectrum between the ASE subchannels.

6. The optical network device of claim 5, wherein the optical channel monitor comprises a wavelength selective switch configured to demultiplex the multiplexing of the WDM signal performed by the WSS component.

7. The optical network device of claim 1, wherein the WSS component is configured, in response to the detected characteristic, to switch from multiplexing the ASE injection channel into the WDM signal to multiplexing the given wavelength channel into the WDM signal.

8. The optical network device of claim 1, wherein the optical network device is part of a reconfigurable optical add/drop multiplexer.

9. A reconfigurable optical add/drop multiplexer comprising:
a wavelength selective switch (WSS) component configured to multiplex wavelength channels from optical signals into a wavelength division multiplexed (WDM) signal;
an amplified spontaneous emission (ASE) source in communication with the WSS component and being configured to generate an ASE signal for multiplexing into the WDM signal; and
an optical channel monitor being configured to monitor the WDM signal,
wherein the WSS component, in response to a given one of the wavelength channels being dropped, is configured to multiplex a ghost channel from the ASE signal into the WDM signal, the ghost channel comprising: a monitoring window and two ASE subchannels for the given wavelength channel, the monitoring window having a spectrum between the ASE subchannels with guard bands between the monitoring window and the two ASE subchannels;
wherein the optical channel monitor is configured to detect, within the monitoring window, a characteristic of the optical signal for the given wavelength channel; and
wherein the WSS component is configured, in response to the detected characteristic, to switch from multiplexing the ghost channel into the WDM signal to multiplexing the given wavelength channel into the WDM signal.

10. The reconfigurable optical add/drop multiplexer of claim 9, comprising an amplifier in communication with the WSS component and being configured to amplify the WDM signal.

11. The reconfigurable optical add/drop multiplexer of claim 10, wherein the amplifier comprises a fiber amplifier.

12. The reconfigurable optical add/drop multiplexer of claim 10, wherein the monitoring window is monitored for signals above a threshold, the threshold being below a peak power of the ASE subchannel.

13. The reconfigurable optical add/drop multiplexer of claim 9, comprising a coupling being configured to direct the WDM signal to outputs, the optical channel monitor in communication with one of the outputs of the coupling.

14. The reconfigurable optical add/drop multiplexer of claim 9, wherein the WSS component is configured to multiplex a portion of the optical signal for the given wavelength channel into the monitoring window defined in the spectrum between the ASE subchannels.

15. The reconfigurable optical add/drop multiplexer of claim 14, wherein the optical channel monitor comprises a wavelength selective switch configured to demultiplex the multiplexing of the WDM signal performed by the WSS component.

16. The reconfigurable optical add/drop multiplexer of claim 9, wherein the WSS component comprises:
a first WSS unit configured to multiplex the wavelength channels into an outgoing one of the WDM signal, the ASE source in commutation with the first WSS unit;
a second WSS unit configured to demultiplex the wavelength channels of an incoming one of the WDM signal; and
a 1×2 switch having a first input in communication with a first coupling with the outgoing WDM signal and having a second input in communication with a second coupling with the incoming WDM signal,
wherein the optical channel monitor is in communication with an output of the 1×2 switch.

17. The reconfigurable optical add/drop multiplexer of claim 16, further comprising an add/drop multiplexer unit in communication with the first and second WSS units, the add/drop multiplexer unit being configured to add/drop optical signals for transmitters and receivers.

18. The reconfigurable optical add/drop multiplexer of claim 17, wherein the add/drop multiplexer unit, the first and second WSS units, the optical channel monitor, and the ASE source constitute a first degree, wherein the reconfigurable optical add/drop multiplexer further comprises a second degree having another add/drop multiplexer unit, additional first and second WSS units, another optical channel monitor, and another ASE source.

19. A method comprising:
multiplexing, with wavelength selective switching, optical signals into wavelength channels of a wavelength division multiplexed (WDM) signal;
generating an amplified spontaneous emission (ASE) signal and multiplexing a ghost channel from the ASE signal into the WDM signal with the wavelength selective switching in response to a given one of the wavelength channels being dropped, the ghost channel comprising: a monitoring window and two ASE subchannels for the given wavelength channel, the monitoring window having a spectrum between the ASE subchannels with guard bands between the monitoring window and the two ASE subchannels;
optical channel monitoring the WDM signal; and
detecting, within the monitoring window in the optical channel monitoring, a characteristic of the optical signal for the given wavelength channel.

20. The method of claim 19, wherein multiplexing the ghost channel having the ASE subchannels comprises multiplexing a portion of the optical signal for the given wavelength channel into the monitoring window defined in the spectrum between the ASE subchannels.

21. The method of claim 20, wherein detecting, within the monitoring window in the optical channel monitoring, the characteristic of the optical signal for the given wavelength channel comprises demultiplexing, with wavelength selective switching, the ASE subchannels and the portion of the optical signal for the given wavelength channel in the monitoring window.

22. The method of claim 19, further comprising switching from multiplexing the ghost channel into the WDM signal to multiplexing the given wavelength channel into the WDM signal in response to the detected characteristic.

23. The method of claim 19, wherein multiplexing the wavelength channels with the wavelength selective switching into the WDM signal comprises multiplexing the wavelength channels into an outgoing one of the WDM signal; and wherein the method further comprises:
demultiplexing the wavelength channels of an incoming one of the WDM signal with wavelength selective switching; and
switching communication between the outgoing WDM signal and the incoming WDM signal with the optical channel monitoring.

24. The optical network device of claim 1, wherein the monitoring window is monitored for signals above a threshold, the threshold being below a peak power of the ASE subchannel.

25. The method of claim 19, wherein the monitoring window is monitored for signals above a threshold the threshold being below a peak power of the ASE subchannel.

* * * * *